Sept. 17, 1968   B. B. MATHEWS ET AL   3,401,730
APPARATUS AND METHOD FOR PROCESSING NUTS
Filed Aug. 22, 1966   3 Sheets-Sheet 1

INVENTORS
BENTLEY B. MATHEWS
PAUL T. FRENTZEN

ATTORNEYS

INVENTORS
BENTLEY B. MATHEWS
PAUL T. FRENTZEN

*Naylor & Neal*
ATTORNEYS

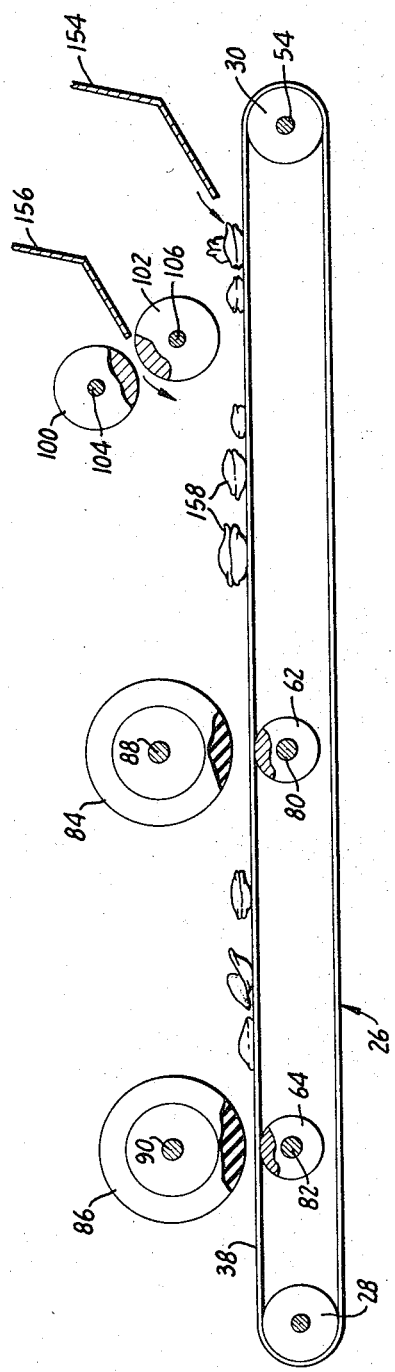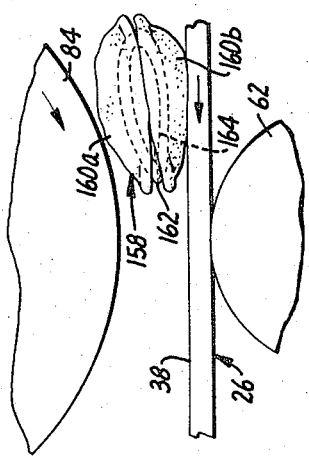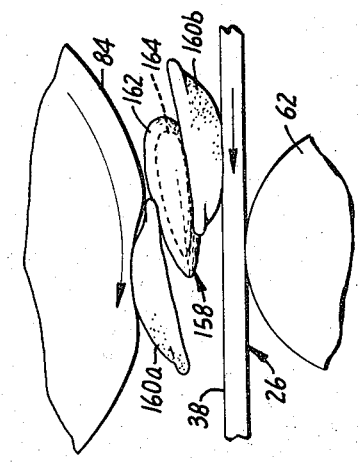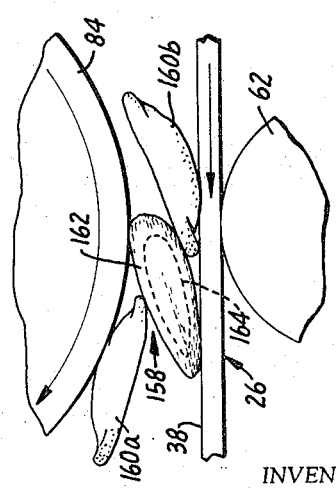
INVENTORS
BENTLEY B. MATHEWS
PAUL T. FRENTZEN
Naylor + Neal
ATTORNEYS

United States Patent Office 3,401,730
Patented Sept. 17, 1968

3,401,730
APPARATUS AND METHOD FOR
PROCESSING NUTS
Bentley B. Mathews, P.O. Box 335, Arbuckle, Calif. 95912, and Paul T. Frentzen, Arbuckle, Calif.; said Frentzen assignor to said Mathews
Filed Aug. 22, 1966, Ser. No. 573,930
9 Claims. (Cl. 146—237)

The present invention relates to an apparatus and method for treating nuts to effect their hulling or shelling and is especially concerned with the effective high-speed hulling of different sized, unhulled nuts without the cracking or shelling of the larger nuts.

In the prior art, the mass hulling of nuts has been effected by various devices. Certain of these devices hurl the nuts as projectiles against a hard surface to effect hulling by impact, while others squeeze the nuts between surfaces to effect hulling by compression and/or shear. Devices of the impact type have the advantage that they are facilitated to handle batches of nuts of different sizes, but have the shortcoming that excessive cracking or shelling of the nuts cannot be accurately controlled. Devices of the compression and/or shear type, conversely, have not been well facilitated for the effective hulling of batches of nuts of different sizes. Prior art devices of the latter type have had the advantage that, when used to hull nuts of uniform size, or only the larger nuts of batches having non-uniform size, cracking or shelling of the nuts could be effectively controlled.

It is, accordingly, a principal object of the present invention to provide a hulling apparatus and method which avoids the shortcomings of the prior art, such as those noted above.

Another and more specific object of the invention is to provide a nut hulling apparatus of the compression and shear type which is facilitated to effectively hull batches of nuts of different sizes and controllable to avoid excessive cracking or shelling of the nuts.

A further object of the invention is to provide an apparatus wherein difficult-to-hull nuts may be selectively cracked to facilitate hulling by shear forces.

Still another object of the invention is to provide a nut hulling apparatus employing compression and shear surfaces wherein the surfaces are adapted to resiliently deflect upon the passage of large, substantially incompressible foreign objects therebetween.

Yet another object of the invention is to provide a nut hulling apparatus having plural compression and shear stations to, successively, effect the hulling of nuts of decreasing size. With respect to this object, it is another object of the invention to provide such an apparatus with means to successively transfer nuts handled thereby to each of the stations in a comparatively "at rest" condition.

The basic apparatus of the invention comprises a plurality of stations for the treatment of nuts handled thereby and a transfer mechanism to effect the movement of bulk quantities of nuts, successively, between these stations. The stations each comprise surfaces to impart, selectively, compressive and/or shearing forces to the nuts directed thereto by the transfer mechanism.

The method of the invention may be defined as a technique for treating nuts of non-uniform size to effect their hulling or shelling. The technique, in its broader aspects, comprises conveying the nuts, successively, between a plurality of hulling or shelling stations, each of which is designed to impart compressive and/or shear forces only to nuts equal to or greater than a predetermined size. In the practice of the technique, the predetermined size setting of each succeeding station is less than that of the station ahead of it by an amount assuring that nuts hulled or shelled at preceding stations will not be subjected to compressive or shear forces.

The foregoing and other objects and the details of the inventive method and apparatus will become more apparent when viewed in light of the following description and accompanying drawings, wherein:

FIG. 6 is a side elevational view diagrammatically illustrating the overall operation of the FIG. 1 apparatus in the hulling of nuts; and, FIGS. 7, 8, and 9 are partial elevational views sequentially illustrating the operation of the shear rollers employed in the inventive apparatus.

Figure 1:
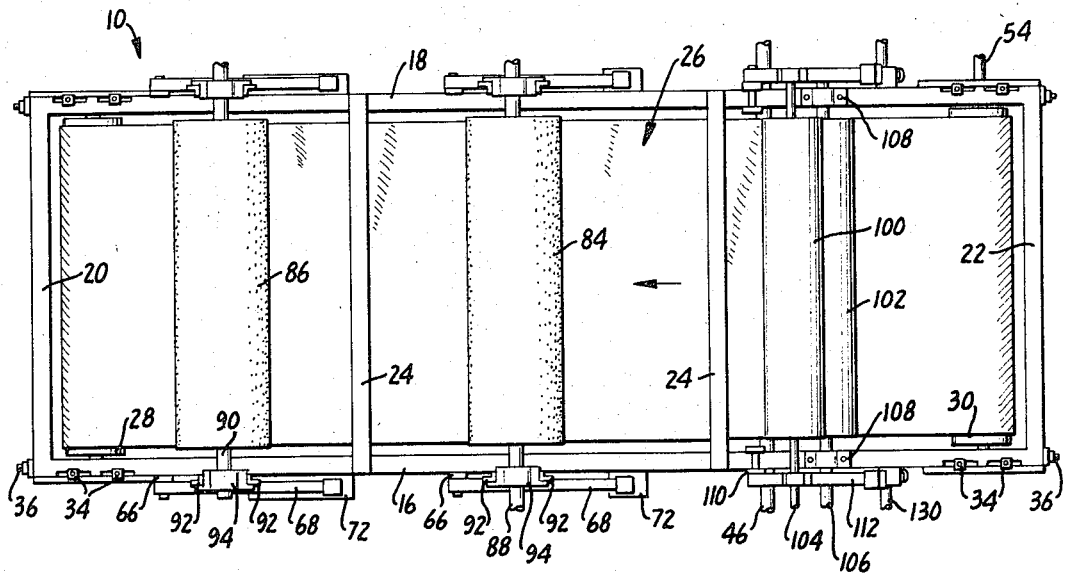
FIG. 1 is a plan view illustrating a preferred embodiment of the apparatus with the drive structure removed partially therefrom.
Figure 2:
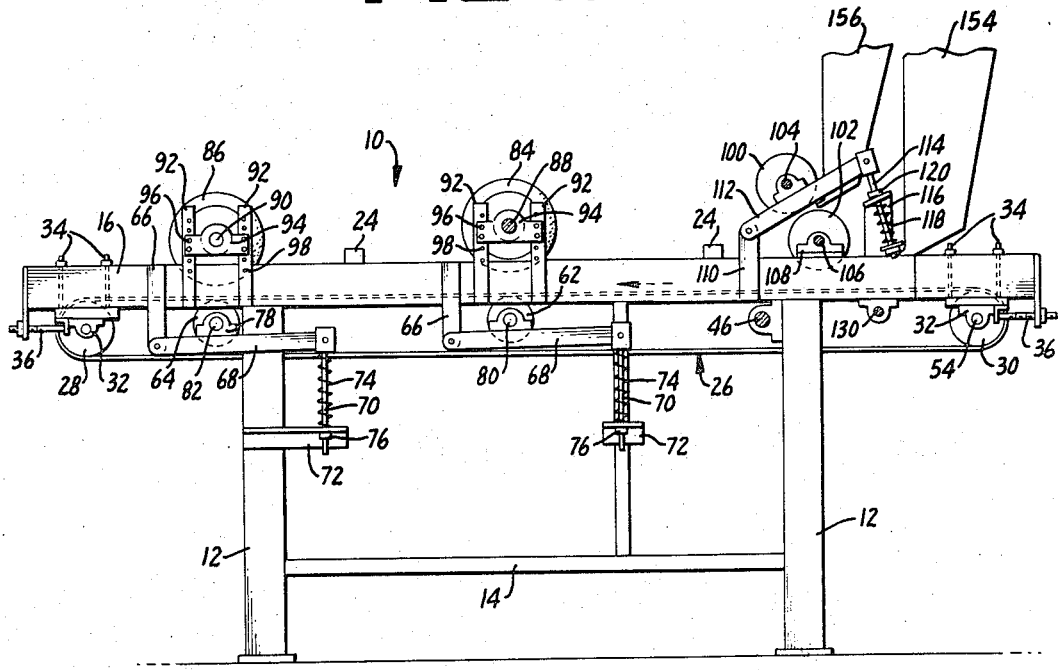
FIG. 2 is a side elevational view illustrating one side of the FIG. 1 apparatus with the drive structure removed partially therefrom.

Referring now specifically to the drawings, the inventive apparatus is designated therein in its entirety by the numeral 10. The apparatus is supported on a framework of relatively conventional nature, comprising: legs 12; cross-braces 14 connecting the legs; side rails 16 and 18 supported on the legs; and, end rails 20 and 22 interconnecting with the side rails. The side rails 16 and 18 are also connected by cross-braces 24.

A continuous belt 26 is supported between the side rails 16 and 18 by a pair of rollers 28 and 30. The rollers 28 and 30 are mounted on the rails 16 and 18 for longitudinal movement relative thereto by trunnions 32. The trunnions 32 are each mounted by a pair of support bolts 34 extending into slidable engagement with the support rail thereabove and a longitudinal adjustment bolt 36. The bolts 36 are independently adjustable to effect both tensioning and alignment of the belt 26.

Figure 3:
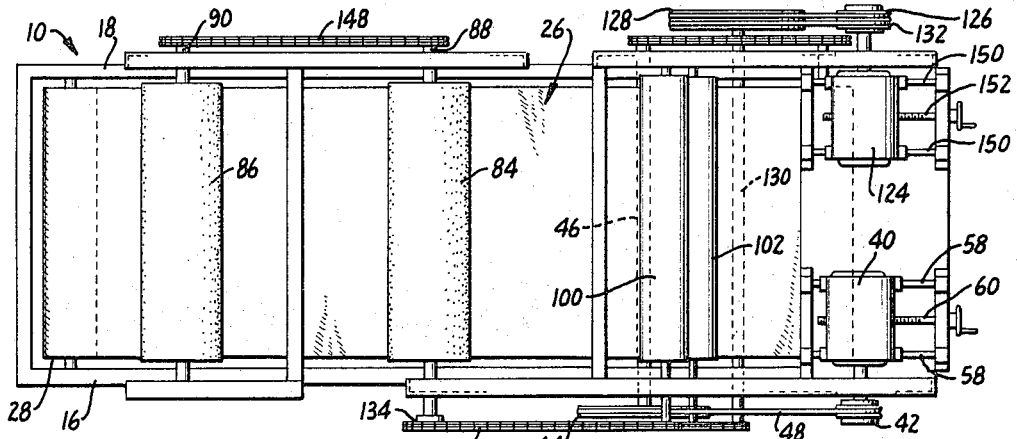
FIG. 3 is a plan view illustrating the FIG. 1 apparatus with the drive structure therefor.
Figure 4:
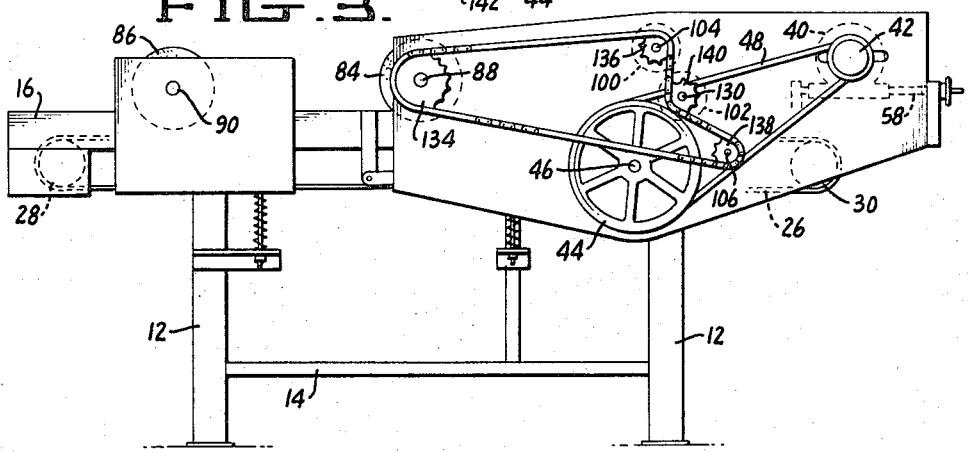
FIGS. 4 and 5 are side elevational views illustrating, respectively, the opposite sides of the FIG. 1 apparatus with the drive structure applied thereto.
Figure 5:
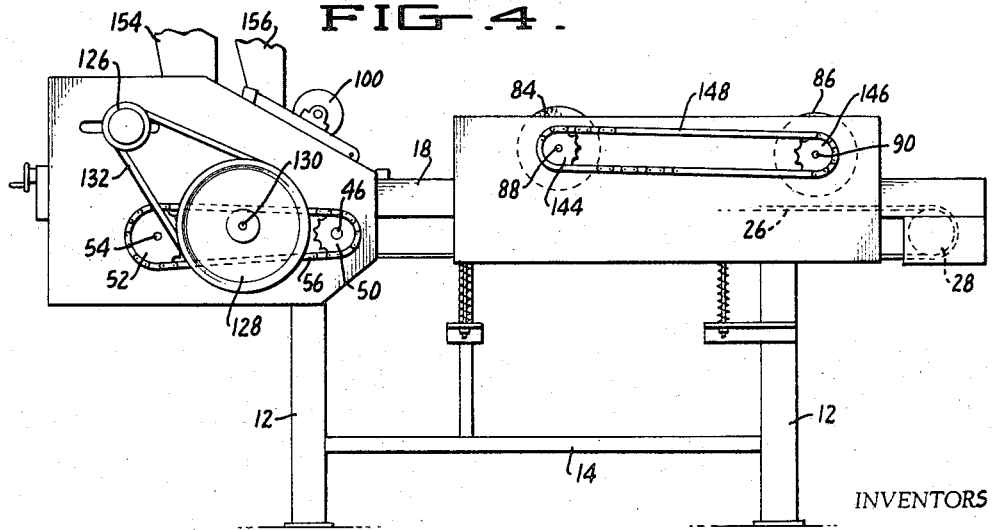

The belt 26 is driven so that the upper reach thereof, designated by the numeral 38, continuously moves in the direction of the arrow lines shown on the drawings (i.e., to the left as viewed in FIGS. 1 to 4 and 6 to 9). Movement is thus imparted to the belt by a drive train comprising: an electric motor 40; a drive sheave 42 mounted on the shaft of the motor; a driven sheave 44 keyed to a shaft 46 supported on and extending transversely of the apparatus frame; a V-belt 48 trained around the sheaves 42 and 44; a pair of sprockets 50 and 52 keyed, respectively, to the shaft 46 and a shaft 54 supporting the roller 30; and, a continuous roller chain 56 trained around the sprockets 50 and 52. The drive sheave 42 is of the variable speed type facilitated to increase and decrease speed of the belt driven thereby responsive, respectively, to movement towards and away from the sheave driven by the belt (i.e., the sheave 44). Movement of the sheave 42 and, thus, speed adjustment of the belt 48, is provided by an adjustable mounting for the motor 40. This mounting, as can be seen from FIG. 3, is of conventional nature and comprises: motor supports 58 slidably mounting the motor and an adjustment screw 60 cooperating with the motor to effect its selective movement along the supports.

The belt 26 has disposed beneath the upper reach 38 thereof a pair of gauging rollers 62 and 64 disposed in spaced substantially parallel relationship relative to each other. The rollers 62 and 64 are each supported for engagement with the undersurface of the reach 38 by a structure comprising: arms 66 fixed to and depending downwardly from each of the side rails 16 and 18; levers 68 pivotally secured at one end thereof, respectively, to each of the arms 66; support rods 70 pivotally secured, respectively, to the ends of each of the levers 68 opposite the connection thereof to the arms 66; support arms 72 fixed to and extending from the framework to slidable engagement, respectively, with each of the rods 70; compression coil springs 74 received around each of the rods 70, respectively, between the levers 68 and arms 72; nuts 76 threadably received on each of the rods 70 for adjustable engagement with the arms 72 cooperating therewith; and, journals 78 supported on each of the levers 68 intermediate the ends thereof. The journals 78 rotatably receive support shafts 80 and 82, respectively, extending through the rollers 62 and 64. Through the support structure thus provided, the rollers 62 and 64 may be vertically adjusted simply by changing the degree to which the nuts 76 are threaded onto the rods 70. This structure also provides for a resilient support of the rollers 62 and 64, since the springs 74 permit the rollers to deflect downwardly upon the application of more than a predetermined amount of force to the upper surfaces thereof. For reasons which will become more apparent subsequently, the springs 74 are so selected as to permit downward deflection of the rollers 62 and 64 only under adverse conditions where rocks or other substantially incompressible foreign objects find their way into the apparatus.

A pair of shear rollers 84 and 86 are supported above the upper reach of the belt 26 in opposed substantially parallel relationship to the gauging rollers 62 and 64, respectively. The rollers 84 and 86 have fixed thereto and extending axially therethrough support shafts 88 and 90, respectively. These shafts are each rotatably mounted by corresponding structure comprising: braces 92 fixed to and extending upwardly from the side rails 16 and 18 to either side of each of the rollers 84 and 86; journals 94 mounted between each pair of the braces 92 and rotatably receiving therein the ends of the shafts 88 and 90; and, bolts 96 adjustably securing the journals 94 to the braces 92. A plurality of openings 98 are provided in each of the braces 92 for alternative receipt of the bolt 96 in order to effect elevational adjustment of the rollers 84 and 86.

A pair of cracking rollers 100 and 102 are mounted above the upper reach of the belt 26 in upstream relationship relative to the rollers 84 and 86. The cracking rollers 100 and 102 are supported on shafts 104 and 106, respectively, fixed thereto and extending axially therethrough. The shaft 106 is mounted on a pair of trunnions 108 fixed to the side rails 16 and 18. The shaft 104 is mounted in substantially parallel relationship to the shaft 106 so as to dispose the roller 100 in opposition to the roller 102 by a structure similar to that employed to support the gauging rollers 62 and 64. This structure comprises a corresponding arrangement on each of the side rails 16 and 18 and, accordingly, like numerals will be used to designate the structure on each rail. Referring now specifically to the structure on rail 16, this comprises: an arm 110 fixed to and extending upwardly from the rail; a lever 112 pivotally secured at one end thereof to the arm 110; a rod 114 pivotally secured at one end thereof to the end of the lever 112 opposed to that connected to the arm 110; a support arm or brace 116 fixed to and extending upwardly from the rail 16 and having therein an opening (not illustrated) slidably received around the rod 114; a compression coil spring 118 received around the rod 114 for engagement with the arm 116 beneath its point of slidable engagement with the rod; a set nut 120 threadably received on the rod 114 for abutment against the arm 116 above the point of its slidable engagement with the rod; and, a compression nut 122 threadably received on the rod 116 beneath the spring 118 for adjustable abutting engagement therewith. Through the mounting arrangement for the cracking roller 100, the distance between the rollers 100 and 102 may be selectively varied by threadably moving the nut 120 on the shaft 114. Similarly, the pressure resiliently forcing the roller 100 towards the roller 102 may be selectively varied by threadably moving the compresion nut 122 on the shaft 114. The spring 116 and nut 122 provide for resilient deflecting of the roller 100 away from the roller 102 when large rocks or other substantially incompressible foreign objects are inadvertently directed between the rollers. During normal cracking, however, the spring 118 does not deflect.

Rotation is imparted to the shear rollers 84 and 86 and the cracking rollers 100 and 102 from an electric motor 124 by a drive train comprising: a dual V-belt drive sheave 126 keyed to the output shaft of the motor; a dual V-belt driven sheave 128 keyed to a shaft 130 journalled to and extending transversely of the apparatus framework; a pair of V-belts 132 engaged around the sheaves 126 and 128; sprockets 134, 136, 138, and 140 keyed, respectively, to the shafts 88, 104, 106, and 130; a roller chain 142 trained around the sprockets 134, 136, 138, and 140; sprockets 144 and 146 keyed to the shafts 88 and 90, respectively; and, a roller chain 148 trained around the sprockets 144 and 146. The drive sheave 126 is of the same variable speed type employed as aforedescribed drive sheave 42. The motor 124 is also adjustably mounted in a manner corresponding to the motor 40 through structure comprising: motor supports 150 mounting the motor for longitudinal movement relative to the apparatus framework; and, an adjustment screw 152 engaging the motor to effect its selective movement along the supports 150. As a result of this variable speed drive sheave and adjustable motor mounting arrangement, the speed at which the rollers 84, 86, 100, and 102 are driven may be selectively varied simply by turning the screw 152. Although varying the speed in this manner simultaneously effects speed variance of all of the rollers, it is to be understood that the speed of any one or more of the rollers could be independently varied by changing the diameter of its drive sprocket.

The apparatus of the invention is completed by a pair of dispensing chutes 154 and 156. These chutes are designed to dispense nuts, respectively, to the upstream end of the reach 38 and to the area between the cracking rollers 100 and 102. The operation of these chutes can best be seen from FIG. 6. From this figure it can also be seen that nuts directed to the cracking rollers 100 and 102 by the chute 156 are discharged from the cracking rollers onto the reach 38.

Attention is here invited to the overall feed and roller arrangement represented in FIG. 6. Specifically, the belt 26 is of sufficient length so that nuts dispensed from either the chute 154 or the rollers 100 and 102 assume an "at rest" condition prior to reaching the roller 84. Similarly, the length of the belt 26 between the rollers 84 and 86 is sufficient that nuts departing from the roller 84 on the reach 38 assume an "at rest" condition prior to reaching the roller 86. The "at rest" condition refers to that condition which a nut would assume if permitted to assume its natural orientation on a stable surface. When dealing with items of a generally ellipsoidal shape, upon assuming this position, the minor dimension of the item would define its height.

*Operation*

In operation of the apparatus, nuts to be hulled are normally dispensed onto the upper reach 38 through the chute 154. During this operation, as is represented by FIG. 6, the belt 26 is driven at a speed sufficient to prevent the nuts from lodging on one another. Thus, when the nuts reach the roller 84, they are in single layer "at rest" condition. It is in this condition that the nuts are subjected to the progressive shearing action sequentially represented in FIGS. 7, 8, and 9. This shearing action is accomplished by driving the roller 84 at a peripheral velocity in excess of the surface velocity of the reach 38. The shearing action is also facilitated by selective setting, as will become more apparent subsequently, of the distance between the surface of the roller 84 and the reach 38.

After nuts pass beneath the roller 84, they again assume a stable "at rest" condition on the reach 38 prior to their direction beneath the roller 86. Upon passing beneath the latter roller, unhulled smaller nuts which escaped the hulling action of the roller 84 are subjected to shear forces in a manner corresponding to that represented sequentially in FIGS. 7, 8, and 9. In the preferred operation of the apparatus, the roller 86 is set above the reach 38 by a distance sufficient to clear the largest hulled nuts leaving the roller 84. Thus, the latter nuts are not scarred or shelled by the roller 86.

It is here noted that the feed dispensed on the reach 38 from the chute 154 is, generally, a relatively heterogeneous mixture comprised of: unhulled nuts of various sizes; hulled nuts; free hulls; and, debris such as sticks and stones of various sizes. Preferably, however, the product is segregated prior to being directed through the chute 154 so that, in bulk, it consists of unhulled nuts. In the exemplary application illustrated in FIGS. 6 to 9, inclusive, the nuts shown are almonds. The almond illustrated in FIGS. 7, 8, and 9 is designated in its entirely by the numeral 158 and comprises: upper and lower hull sections 160a and 160b, respectively; a shell 162; and, a kernel 164.

In the exemplary application illustrated in FIGS. 6 to 9, it is the prime purpose of the apparatus to effect the hulling of the various size almonds directed thereto. Related objectives of the apparatus are, however, to avoid the shelling of almonds during hulling and to permit the passage of debris, such as rocks, therethrough with a minimum of disturbance. The latter objective is accomplished by the resilient mountings for the gauging rollers 62 and 64 which permit their deflection. The shelling of almonds during hulling is prevented, in large part, by adjusting the distance between the roller 84 and the reach 38 so that only the very largest nuts directed to the roller are subjected to shelling action thereby. This distance is selected experimentally in order to assure that, at most, a very minor fraction of the total product directed to the apparatus is shelled. It is here again noted that the distance between the roller 86 and the reach 38 is set to clear the largest hulled nuts directed thereto from the roller 84. This setting is more than sufficient to permit even the largest shelled nuts to pass freely beneath the roller 86. Thus, with this preferred setting, the roller 86 does not impart shear forces to either hulled or shelled nuts directed thereto.

At this point, attention is invited to the fact that the surfaces of the rollers 84 and 86 and the outer surface of the belt 26 are all fabricated of resilient materials. These materials are selected so as to have predetermined characteristics of coefficient of friction and resiliency. These characteristics are selected so that maximum shear forces and minimum shell cracking forces will be imparted to the product being handled. The rollers 62, 64, 100, and 102 are, however, preferably fabricated on an incompressible material, such as steel. The cracking rollers 100 and 102 may also be provided with a textured surface, such as knurling, to enhance their gripping characteristics.

In the exemplary application illustrated in FIGS. 6 to 9, after nuts dispensed from the chute 154 pass beneath the shear roller 84, they comprise a product consisting of: hulled medium sized nuts; unhulled small sized nuts; and, shelled large sized nuts. The hulled medium sized nuts and shelled large sized nuts typically comprise, respectively, the largest and smallest proportions of this product. The unhulled small nuts of this product are largest in physical dimensions. It is also possible that this product may contain a small percentage of large sized unhulled nuts which, due to their unusual tenacity, resisted hulling by the shear roller 84.

After the aforedescribed exemplary product passes beneath the roller 86, its composition is changed to the extent that the unhulled small sized nuts are hulled by the action of the shear roller 86. Thus, the final product departing from the roller 86 is comprised of hulled nuts of various sizes and large sized shelled nuts. The hulled nuts of this product comprise by far its largest portion. It is also possible that this final product, similarly to that which departed from the roller 84, includes a small percentage of unhulled tenacious nuts which resisted the action of both of the shear rollers.

In the preferred operation of the apparatus, any unhulled nuts of the latter category are segregated from the product and recycled by either being directed to the chute 154 or the chute 156. The particular chute chosen depends upon the tenacity of the nuts involved. Specifically, if it appears that the nuts could be hulled simply by recycle through the shear rollers 84 and 86, the chute 154 is employed. However, if it appears that simple recycle through the shear rollers 84 and 86 would be fruitless for hulling purposes, the chute 156 is employed. In the latter event, the nuts are subjected to cracking by the rollers 100 and 102 prior to being recycled past the rollers 84 and 86 for shear action.

The rollers 100 and 102 are typically set apart by a distance slightly less than that between the roller 86 and the reach 38. Thus, the rollers effect cracking of the hulls of all unhulled nuts directed therebetween. It is also possible, where the nuts are of relatively large size, that the rollers 100 and 102 may effect cracking of the shells thereof. In the latter event, upon passing beneath the shear rollers 84 and 86, the nuts will be shelled.

*Conclusion*

From the foregoing detailed description, it is believed apparent that the invention enables the accomplishment of the objects initially set forth herein. In particular, an apparatus and method is provided whereby the bulk quantities of nuts of heterogeneous sizes may be efficiently and effectively hulled. It is to be understood, however, that the invention is not intended to be limited to the specific details herein illustrated and described. For example, although hulling has been envisioned as the primary use of the invention, it is also anticipated that it might be employed in processes where shelling is the primary objective. When thus employed, the feed product would basically comprise hulled nuts and the staged operation would correspond to that of the aforedescribed hulling operation, with the exception that the shear and/or cracking rollers would act on the shells of the nuts, rather than the hulls.

Accordingly, what is claimed is:

1. A machine for treating nuts, comprising:
 (a) a pair of support rollers disposed in horizontally spaced substantially parallel relationship;
 (b) a continuous belt trained around said rollers so as to define taut upper and lower reaches, said belt having a resilient outer surface;
 (c) drive means to effect the continuous movement of said belt about said rollers at selectively variable speeds;
 (d) means to dispense nuts on the upper reach of said belt at an upstream portion thereof;
 (e) first and second substantially incompressible gauging rollers disposed beneath and in engagement with the upper reach of said belt in substantially parallel relationship to said support rollers, said gauging rollers being characterized in that:
  (1) the first thereof is disposed downstream of said upstream portion by a distance sufficient to permit nuts dispensed on said portion to assume a substantially at rest condition on the upper reach of said belt prior to passing over said first gauging roller; and,
  (2) the second thereof is disposed downstream of said first gauging roller by a distance sufficient to permit nuts disturbed upon the upper reach of said belt above said first gauging roller to assume a substantially at rest condition prior to passing over said second gauging roller;

(f) first and second shear rollers disposed above and in spaced relationship to the upper reach of said belt in opposition, respectively, to said first and second gauging rollers, said shear rollers having resilient outer surfaces;

(g) drive means to effect the rotation of said shear rollers at selectively variable speeds; and, (h) adjustment means to selectively and independently vary the distance between said first and second shear rollers and the upper reach of said belt whereby said first and second shear rollers may be adjusted, respectively, for shearing engagement with relatively large and small nuts directed thereto by said belt.

2. A machine according to claim 1, including deflection means operatively associated with each of said gauging rollers and the shear roller opposed thereto to premit said opposed rollers to resiliently spread apart upon the direction therebetween by said belt of large rocks or other substantially incompressible foreign objects having a height greater than the adjusted distance between said shear rollers and the upper reach of said belt.

3. A machine according to claim 1, including nut cracking means interposed in said dispensing means to effect the cracking of nuts directed therethrough, said cracking means comprising:

(a) first and second substantially incompressible cracking rollers disposed in opposed substantially parallel relationship so as to define therebetween a converging passage in the path of nuts directed through said dispensing means;

(b) drive means to effect the rotation of said rollers in the same direction of peripheral movement whereby the converging passage defined by said rollers effects the propulsion and compression of nuts directed through said dispensing means; and, (c) adjustment means to selectively vary the distance between said cracking rollers.

4. A machine according to claim 3, including deflection means operatively associated with said cracking rollers to permit said rollers to resiliently spread apart upon the direction therebetween of large rocks or other substantially incompressible foreign objects having a height greater than the adjusted distance between said rollers.

5. A machine for treating nuts, comprising:

(a) a pair of support rollers disposed in horizontally spaced substantially parallel relationship;

(b) a continuous belt trained around said rollers so as to define taut upper and lower reaches, said belt having a resilient outer surface;

(c) drive means to effect the continuous movement of said belt about said rollers at selectively variable speeds;

(d) means to dispense nuts on the upper reach of said belt at an upstream portion thereof;

(e) cracking means interposed in said dispensing means to effect the cracking of nuts directed therethrough, said cracking means comprising:

(1) first and second substantially incompressible cracking rollers disposed in opposed substantially parallel relationship so as to define therebetween a converging passage in the path of nuts directed through said dispensing means;

(2) drive means to effect rotation of said rollers in the same direction of peripheral movement whereby the converging passage defined by rollers effects the propulsion and compression of nuts directed through said dispensing means; and, (3) adjustment means to selectively vary the distance between said cracking rollers;

(f) a substantially incompressible gauging roller disposed beneath and in engagement with the upper reach of said belt in parallel relationship to said support rollers, said gauging roller being disposed downstream of said upstream portion by a distance sufficient to permit nuts dispensed on said portion to assume a substantially at rest condition on the upper reach of said belt prior to passing over said gauging roller;

(g) a shear roller disposed above and in spaced relationship to the upper reach of said belt in opposition to said gauging roller, said shear roller having a resilient outer surface;

(h) drive means to effect the rotation of said shear roller at selectively variable speeds; and, (i) adjustment means to selectively vary the distance between said shear roller and the upper reach of said belt.

6. A machine according to claim 5, including deflection means operatively associated with said gauging and shear rollers to permit said rollers to resiliently spread apart upon the direction therebetween by said belt of large rocks or other substantially incompressible foreign objects having a height greater than the adjusted distance between said shear roller and the upper reach of said belt.

7. A machine according to claim 6, including deflection means operatively associated with said cracking rollers to permit said rollers to resiliently spread apart upon the direction therebetween of large rocks or other substantially incompressible foreign objects having a height greater than the adjusted distance between said rollers.

8. A method of treating nuts of non-uniform size, comprising:

(a) conveying nuts on a moving resilient first surface from a first station where nuts are dispensed on said surface to successive second and third stations;

(b) subjecting the larger of the nuts to shear and compressive forces at said second station by engaging said larger nuts between said first surface and a second resilient surface spaced thereabove by a predetermined distance and moving in the same direction, but at a different velocity; and, (c) subjecting the smaller of the nuts to shear and compressive forces at said third station by engaging said smaller nuts between said first surface and a third resilient surface spaced thereabove by a predetermined distance less than the predetermined distance, said second resilient surface is spaced from said first surface and moving in the same direction, but at a different velocity.

9. A method according to claim 8, including passing said nuts between a pair of substantially incompressible surfaces spaced apart by a distance sufficient to impart cracking forces to said nuts upon passage therebetween prior to dispensing of said nuts on said first surface at said first station.

References Cited

UNITED STATES PATENTS

| | | | |
|---|---|---|---|
| 1,623,739 | 4/1927 | Macfarlane | 146—8 |
| 1,678,098 | 7/1928 | Bailey | 146—11 |
| 2,144,841 | 1/1939 | Glaser | 146—11 |
| 3,303,864 | 2/1967 | Bailey | 146—11 |

W. GRAYDON ABERCROMBIE, *Primary Examiner.*